United States Patent
Black

(10) Patent No.: US 7,130,282 B2
(45) Date of Patent: Oct. 31, 2006

(54) COMMUNICATION DEVICE FOR PROVIDING MULTIMEDIA IN A GROUP COMMUNICATION NETWORK

(75) Inventor: Peter J. Black, San Diego, CA (US)

(73) Assignee: Qualcomm INC, San Diego, CA (US)

( * ) Notice: Subject to any disclaimer, the term of this patent is extended or adjusted under 35 U.S.C. 154(b) by 654 days.

(21) Appl. No.: 10/247,973

(22) Filed: Sep. 20, 2002

(65) Prior Publication Data

US 2004/0057405 A1    Mar. 25, 2004

(51) Int. Cl.
*H04L 5/16* (2006.01)

(52) U.S. Cl. .................................. 370/296; 370/352

(58) Field of Classification Search .................. None
See application file for complete search history.

(56) References Cited

U.S. PATENT DOCUMENTS

| | | | |
|---|---|---|---|
| 6,011,782 A | | 1/2000 | DeSimone et al. ......... 370/260 |
| 6,037,991 A | * | 3/2000 | Thro et al. .................. 725/116 |
| 6,084,919 A | * | 7/2000 | Kleider et al. ............. 375/285 |
| 6,321,095 B1 | * | 11/2001 | Gavette ...................... 455/517 |
| 6,404,761 B1 | * | 6/2002 | Snelling et al. ............. 370/352 |
| 6,930,994 B1 | * | 8/2005 | Stubbs ........................ 370/348 |

FOREIGN PATENT DOCUMENTS

| | | |
|---|---|---|
| EP | 0744857 | 11/1996 |
| WO | 0120939 | 3/2001 |
| WO | 0167675 | 9/2001 |

* cited by examiner

*Primary Examiner*—Duc Ho
(74) *Attorney, Agent, or Firm*—Philip R. Wadsworth; Robert J. O'Connell; John L. Ciccozzi

(57) ABSTRACT

A system and method for providing group communication services is disclosed. Each of a plurality of group communication devices coverts media, such as video, audio, image and/or data into data packets suitable for transmission over a data network, such as the Internet. The data packets are selectively transmitted through the data network to a communications manager. The communications manager acts as a configurable switch, allowing communications from any communication device to be selectively routed to the plurality of communication devices based on the types of the communication devices and/or the requests received from the corresponding users. The communications manager further allows users of other communication systems and devices to participate in group communications with each other.

24 Claims, 7 Drawing Sheets

COMMUNICATION DEVICE FOR PROVIDING MULTIMEDIA IN A GROUP COMMUNICATION NETWORK

CROSS-REFERENCE TO RELATED APPLICATION

This application relates to the U.S. patent application Ser. No. 09/518,985, filed Mar. 3, 2000, pending, which application is incorporated herein by reference in its entirety.

I. FIELD

The system and method for providing group communication services relates generally to point-to-multipoint communication systems and more particularly to a method and apparatus for providing video, audio, image, and/or data in a group communication network.

II. BACKGROUND

Point-to-multipoint communication systems provide communications generally between a central location and multiple users of the system. For example, dispatch systems using Land Mobile Radios (LMRs) have been used in trucks, taxis, buses, and other vehicles in order to communicate scheduling information between a central dispatch center and one or more corresponding fleet vehicles. Communications may be directed at a specific vehicle in the fleet or to all vehicles simultaneously.

A class of wireless services intended for quick, efficient, one-to-one or one-to-many (group) communication operates in half-duplex communication, using a forward link or a reverse link at a time. A user presses a "push-to-talk" (PTT) button on a phone/radio to initiate a group communication. If granted the floor, the user provides media for a short time period. After the user releases the PTT button, other users may request the floor. These services have traditionally been used in applications where one person, a "dispatcher," needs to communicate with a group of people, such as field service personnel or taxi drivers. Similar services have been offered on the Internet and are generally known as "voice chat."

A key feature of these services is that communication is quick and spontaneous, usually initiated by simply pressing a PTT button, without going through a typical dialing and ringing sequence. Communication in this type of service is generally very short, with individual media "spurts" being generally on the order of several seconds, and "communications" lasting possibly a minute or less. The time delay between when the user requests the floor and when the user receives a positive or negative confirmation from a communication manager, indicating that the user has the floor and may begin providing media, is known as PTT latency.

PTT half-duplex communication offers a number of advantages, such as improved bandwidth efficiency, reduced sensitivity to latency, and simplified echo cancellation.

There is a need, therefore, for concurrent communication of multimedia, e.g., audio, video, image and/or data, in half duplex mode, which provides the advantages of PTT group communication services.

SUMMARY

The disclosed embodiments provide methods and apparatus for receiving multimedia from a communication manager (CM) operating in a group communication network. The method and apparatus provides for providing a type of a communication device (CD) to the CM, the type indicating the media that the CD is capable of receiving, and selectively receiving the media based on the type of the CD. In one aspect, the type indicates a video camera and the media includes video. In another aspect, the type includes a still camera and the media includes still image.

In another aspect, the method and apparatus provides for providing a request to the CM, the request indicating the media that a user wishes to receive, and selectively receiving the media based on the request. In one aspect, the request includes receiving video. In another aspect, the request includes receiving one or more still images.

BRIEF DESCRIPTION OF THE DRAWINGS

The features, objects, and advantages of the system and method for providing group communication services will become more apparent from the detailed description set forth below when taken in conjunction with the drawings in which like reference characters identify correspondingly throughout and wherein.

DETAILED DESCRIPTION OF THE PREFERRED EMBODIMENTS

The system and method for providing group communication services uses a communication device (CD) capable of generating data packets suitable for transmission over a data network such as the Internet. The data packets are transmitted to a data network, and are then provided to a communications manager (CM) connected to the data network. The CM processes data packets that it receives from a first CD and distributes the data packets in real-time to at least one other CD that is a member of the same group. The CM acts as a configurable switch that is able to route communications from any group member to other group members defined by the group.

Although the teachings of the system and method for providing group communication services are described with respect to a wireless CDMA communication system, it should be understood that the system and method for providing group communication services can be used with any wireless communication system including GSM systems, AMPS systems, TDMA systems, and satellite communication systems, as well as other communications systems. In addition, the system and method for providing group communication services is not limited to wireless communication systems. It can be used with wireline telephones, paging devices, portable or desktop computers, digital cameras, video cameras, etc. Furthermore, it should be understood that the system and method for providing group communication services is applicable to both real-time data, such as audio and video data, and time-independent data, such as computer files, email, and so on.

Figure 1:
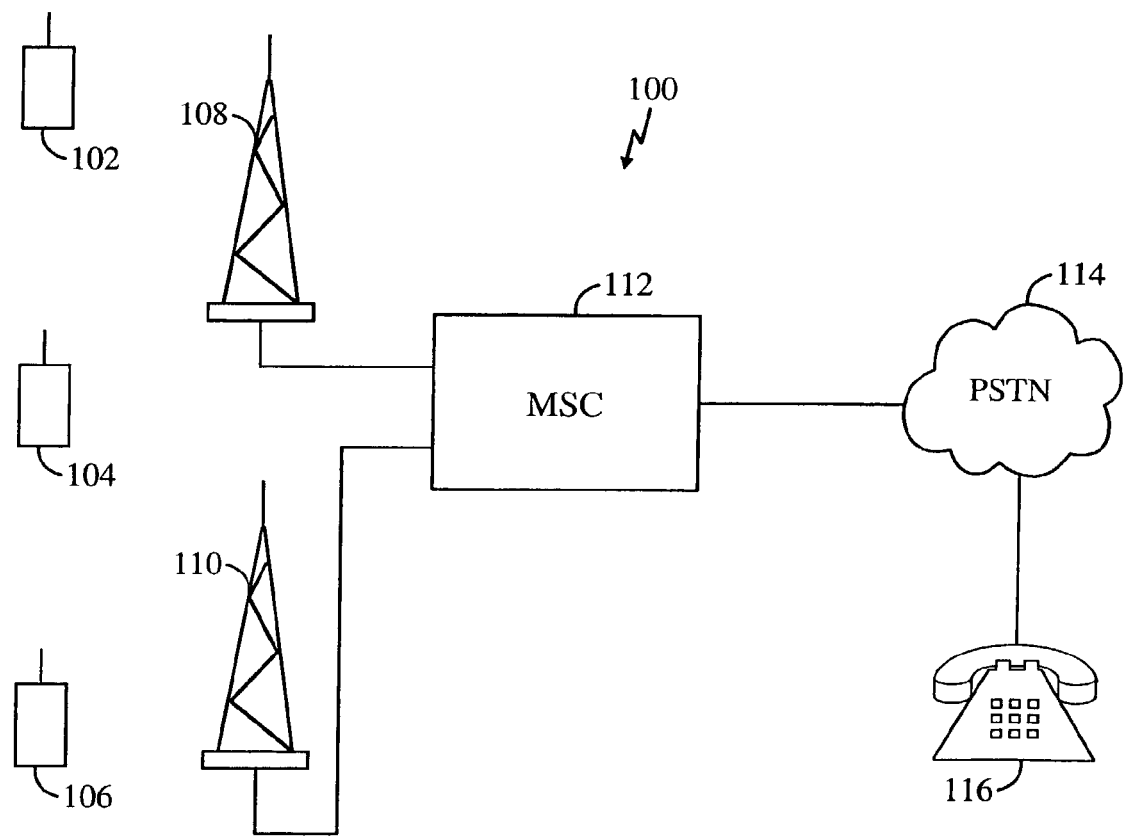
FIG. 1 is an illustration of a typical prior art wireless communication system.

FIG. 1 is an illustration of a typical prior art wireless communication system 100 incapable of implementing group communications, otherwise known as point-to-multipoint communications, or push-to-talk communications. CDs 102, 104, 106 represent three of a vast number of wireless telephones dispersed over a small geographic area served by communication system 100. CDs 102, 104, 106 transmit and receive communication signals from base stations 108, 110, generally depending on their proximity to each base station. In a typical wireless communication system, there are many base stations in use to support the vast numbers of CDs active in communication system 100.

Base stations 108 and 110 are connected to Mobile Switching Center (MSC) 112. MSC 112 provides various functionality to the wireless communication system, such as providing system control to base stations 108 and 110. In addition, MSC 112 provides switching and interface circuitry between base stations 108 and 110, and the Public Switched Telephone Network (PSTN) 114.

In communication system of FIG. 1, conferencing between multiple users in the wireless communication system may be achieved if special circuitry is employed within MSC 112 to allow such conference calls to be made. For example, wireline telephone 116 may be able to communicate video and/or audio with CDs 102 and 104 simultaneously in a full-duplex conference manner.

GENERAL OVERVIEW

Figure 2:
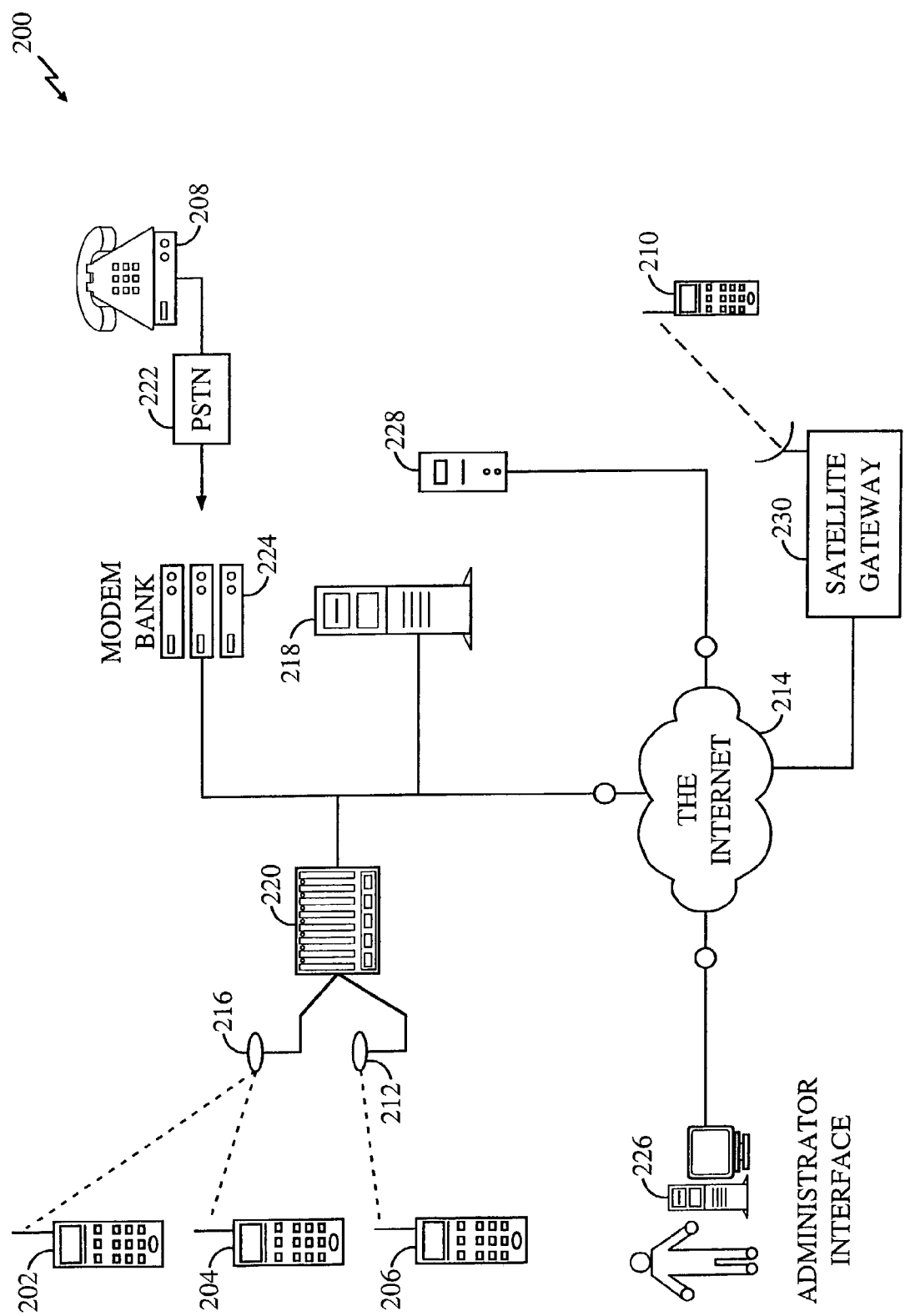
FIG. 2 illustrates a group communication system of one embodiment of the system and method for providing group communication services in functional block diagram format.

One embodiment of the system and method for providing group communication services is illustrated in functional block diagram format in FIG. 2. Shown is group communication system 200, supports a push-to-talk system, a group broadcast system, a dispatch system, a point-to-multipoint communication system, or a video conferencing service. A defining characteristic of such a communication system is that, generally, only one user transmits information to other users at any given time, in a half-duplex mode. In group communication system 200, a group of communication device users, individually known as group members, communicate with one another using a communication device assigned to each group member.

In one embodiment, group communication system 200 supports both chat-room and ad-hoc models for group communication services. In the chat-room model, groups are predefined, which may be stored on the communication manager. The predefined groups, or nets, may be public, implying that the group has an open member list. In this case, each group member is a potential participant in a group. The group communication is started when a first member of the group initiates a group communication. The communication remains running for a predetermined time period, which may be configured by the service provider. During a group communication, the group members may specifically request to join or leave the group. During periods of group inactivity, the group may be brought into a group dormant state until a group member requests permission to communicate media. When operating in the chat-room model, group members, also known as net members, communicate with one another using a communication device assigned to each group member. The term "net" denotes a group of members authorized to communicate with each other.

In the ad-hoc model of group communication services, however, groups may be defined in real-time and have a closed member list associated with each group. A closed member list may specify which members are allowed to participate in the group communication. The member list may not be available to others outside of the closed member list, and may only exist for the life of the present communication. Ad-hoc group definitions may not be stored in the communication manager. The definitions may be used to establish the group communication and released after the communication has ended. An ad-hoc group may be formed when a user selects one or more target members and generates a group communication request, which is sent to the communication manager to start the communication. The communication manager may send a notification to the target group members that they have been included in the group. The communication manager may automatically join the target members into the group, i.e., no action may be required from the target members. When an ad-hoc group becomes inactive, the communication manager may "tear down" the group and free the resources assigned to the group, including the group definition used to start the group communication.

Group members communicate with each other using an assigned communication device, shown as communication devices (CD) 202, 204, 206, 208, and 210. In the present example, CDs 202, 204, and 206 are wireless telephones, CD 208 is a wireline telephone equipped with push-to-talk capability, and CD 210 is a satellite telephone also equipped with push-to-talk functionality. In other embodiments, the various CDs may comprise wireless video cameras, still cameras, audio devices such as music recorders or players, laptop or desktop computers, or paging devices. In another embodiment, at least one CD comprises a combination of the just-described embodiments. For example, CD 202 could comprise a wireless terrestrial telephone equipped with a video camera and display. Furthermore, each CD may be able to send and receive information in either a secure mode, or a non-secure (clear) mode. Throughout the following discussion, reference to an individual CD may be expressed as CD 202. However, it should be understood that reference to CD 202 is not intended to limit the discussion to a terrestrial wireless telephone. In general, discussions pertaining to CD 202 will apply equally to other types of CDs as well.

In the group communication system of FIG. 2, an exclusive transmission privilege for a specific media allows only a single group member to transmit the specific media to other group members at any given time. The transmission privilege for the specific media is granted or denied to the requesting group members, depending on whether or not the transmission privilege for the specific media is currently assigned to another group member when the request is received. The process of granting and denying transmission requests is known as arbitration. Arbitration may be for a single media, when the requesting group members request for transmission privilege for the same media, e.g., each requesting group member requests for video. Arbitration may also be jointly for more than one media, when the requesting group members request for transmission privileges for more than one media, e.g., each requesting group member requests for both audio and video transmission privileges. Arbitration schemes evaluate factors, such as priority levels assigned to each CD, the number of requests received from a user, and the length of time the current user has had exclusive communication privilege, in determining whether a requesting group member is granted the transmission privilege.

In order to participate in group communications CDs 202, 204, 206, 208 and 210 are each equipped with a means for requesting the transmission privilege from a communications manager (CM) 218, as explained in greater detail below. CM 218 manages the real-time and administrative operation of groups, including PTT request arbitration, maintenance, and distribution of group membership and registration lists, call set-up and tear-down of necessary system and network resources, as well as overall control of group status.

CM 218 may maintain a list of defined groups, defined as either clear or secure, and transitions between clear and secure are generally not permitted. A secure group relies on encryption provided by CDs to provide authentication and guard against eavesdropping. Encryption for secure groups is implemented on an end-to-end basis, meaning that encryption and decryption takes place within each CD. CM 218 may operate with no knowledge of security algorithms, keys, or policies.

CM 218 may be managed remotely by either a communication system service provider, group members, or both, assuming that authorization is provided by the service provider. CM 218 may receive group definitions through an external administration interface 226 or from any of the participating CDs. Group members may request administrative actions through their service provider or administrate group functions through defined systems, such as a member-operated security manager (SM) 228 that conforms to an administration interface. CM 218 can authenticate to high-grade commercial standards any party attempting to establish or modify a group.

SM 228 is an optional component of the system 200 that performs key management (i.e., distribution of encryption keys to group members), user authentication, and related tasks to support secure groups. A single group communication system may interact with one or more SMs. SM 228 may have administration capabilities compatible with a CM 218 interface to automate administration functions. SM 218 may also be capable of acting as a data endpoint for the purpose of participating in a group, to broadcast group keys, or simply monitor group traffic.

In one embodiment, the means for requesting the transmission privilege comprises a push-to-talk (PTT) key or switch. When a user in communication system 200 desires to transmit information, such as audio, video, and/or data, to other group members, the push-to-talk switch located on his or her CD is depressed, sending a request to obtain the transmission privilege from communication manager 218. If no other group member is currently assigned the transmission privilege, the requesting user is granted the transmission privilege and is notified by an audible, visual, or tactile alert through the CD. After the requesting user has been granted the transmission privilege, media may then be transmitted from that user to the other group members.

In one embodiment of the system and method for providing group communication services, each wireless group member establishes a forward link and a reverse link with one or more base stations 216 or satellite gateway 212, as the case may be. The former is used to describe a communication channel from a base station 216 or satellite gateway 212 to a CD, the latter used to describe a communication channel from a CD to a base station 216 or gateway 212. Voice, video, and/or data is converted into data packets using a CD, the data packets being suitable for the particular data network 214 through which communications to other users take place. In one embodiment, data network 214 is the Internet. In another embodiment, a dedicated forward channel is established in each communication system (i.e., a terrestrial communication system and a satellite communication system) for broadcasting information from each group member to the other group members. Each group member receives communications from other group members over the dedicated channel. In yet another embodiment, a dedicated reverse link is established in each communication system for transmitting information to CM 218. Finally, a combination of the above schemes may be used, for instance, establishing a dedicated forward broadcast channel but requiring wireless CDs to transmit information to CM 218 over an individual reverse link assigned to each CD.

When a first group member wishes to transmit media to other members of the group, the first group member requests the transmission privilege by pressing a push-to-talk key on his or her CD, which generates a request formatted for transmission over data network 214. In the case of CDs 202, 204, and 206, the request is transmitted over-the-air to one or more base stations 216. MSC 220 comprises a well-known Inter Working Function (IWF) (not shown) for processing data packets, including the request, between MSC 220 and data network 214. For CD 210, the request is transmitted via satellite to satellite gateway 230. For CD 208, the request is transmitted to the Public Switched Telephone Network (PSTN) 222, then to modem bank 224. Modem bank 224 receives the request and provides it to data network 214.

If no other member currently holds the transmission privilege, when a transmission privilege request is received by CM 218, CM 218 transmits a message to the requesting group member, notifying it that the transmission privilege has been granted. Audio, visual, or other information from the first group member may then be selectively transmitted to the other group members by sending the selected information to CM 218, using one of the just-described transmission paths. In one embodiment, CM 218 then provides the information to the group members by selectively duplicating the information and selectively sending a duplicate to the group members. If a single broadcast channel is used, the information need only be duplicated once for each broadcast channel in use.

In an alternative embodiment, CM 218 is incorporated into MSC 220 so that data packets from supporting base stations are routed directly to CM 218 without being routed onto data network 214. In this embodiment, CM 218 is still connected to data network 214 so that other communication systems and devices can participate in a group communication.

In one embodiment, CM 218 maintains one or more databases for managing information pertaining to individual group members as well as to each defined group. For example, for each group member, one database may comprise a user name, an account number, a telephone number, or a dial number, associated with the member's CD, a Mobile Identification Number assigned to the CD, the current member's status in the group, such as whether the member is actively participating in the group, a priority code for determining how the transmission privilege is assigned, a data telephone number associated with the CD, an IP address associated with the CD, and an indication of which groups the member is authorized to communicate. Other related types of information, such as whether the CD has video, and/or display capability, may also be stored by the database with respect to each group member.

A group member may select the type of information, e.g., audio, video, still image, and/or data, which he or she wishes to be sent to, or receive from, other group members. The media selection may be based on the type of the CD that the group member is using. For example, if the CD has video capability, the group member may send video to, or receive video from, CM 218, alone or in addition to audio and/or data. The media selection may be also based on whether the group member wishes to pay for the extra cost associated with using video capability of the CD. The group member may choose to send video or a series of still images at a reduced rate of transmission, e.g., a certain number of still images per a certain time period, rather than sending full video.

CM 218 may store information, such as the type of information, e.g., audio, video, and/or data, which each group member wishes to send or receive, as well as the type of the CD that the group member is using. For example, if a target group member has selected to receive video, or if the target CD has video capability, CM 218 may send video, alone or in addition to audio and/or data, to the target CD. Otherwise, if a target group member has selected to receive no video, or if the target CD has no video capability, CM 218 may send no video to the target group member. CM 218 may send still images to the target CD if the target CD has a display and/or the target group member has requested to receive only still images, rather than full video.

DETAILED DESCRIPTION

Interfaces to the system are grouped into functional and physical interfaces. The physical interfaces are not unique to group communication system 200 and consist of an existing wireless air interface, wireless service options, and commercial data networking standards. Higher layer functional interfaces, especially at the application layer, are unique to the group communication service.

Figure 3:
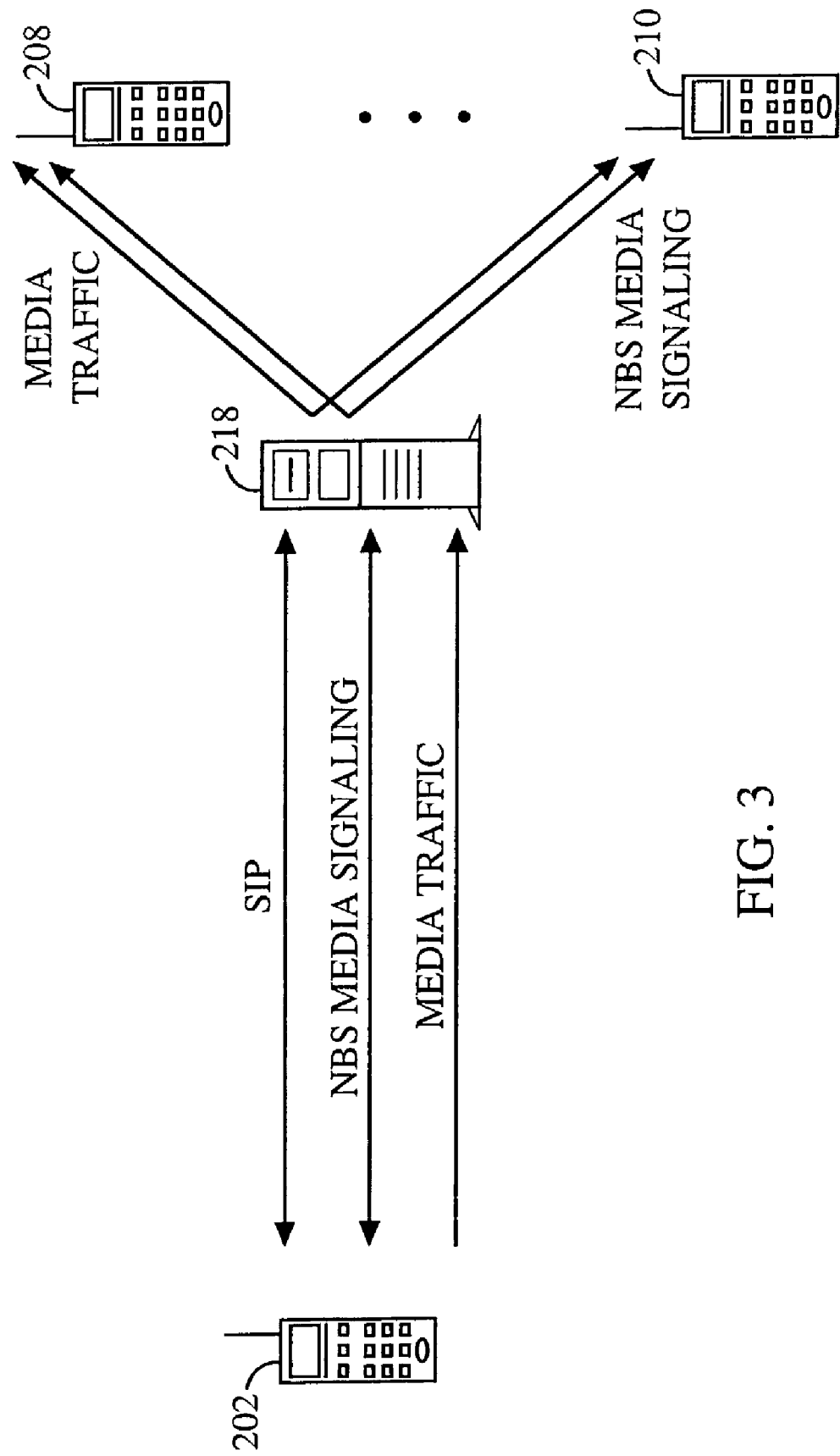
FIG. 3 illustrates the operating protocols used in the group communication system of FIG. 2.

At the application level, the system and method for providing group communication services operates over three Internet-based protocols in one embodiment, as shown in FIG. 3. Of course, other protocols, or a different number of protocols, could be used in the alternative. Communications between CM 218, and CDs 202, 208, and 210 occur within these protocols. CDs may find, join, leave, and learn about various groups using a first protocol, such as the Session Initiation Protocol (SIP), which is a well-known signaling protocol used in the telecommunications industry. The second protocol, shown in FIG. 3 as NBS Media Signaling, may be used to manage real-time group arbitration and dormancy. Audio, voice, video, and/or data (collectively referred to herein as media), is distributed via a third protocol, shown in FIG. 3 as media traffic. In the example of FIG. 3, CD 202 currently "has the floor", i.e., the transmission privilege, or permission to transmit media to the group. A "floor-control" request is a request for the transmission privilege. While CD 202 holds the transmission privilege, the remaining group members are designated as listeners and correspondingly do not have permission to transmit media to the group. Generally, any CD can send media-signaling or SIP signaling traffic at any time, regardless of whether it holds the transmission privilege.

In one embodiment, CM 218 includes modem bank 224, which interfaces to PSTN 222. In another embodiment, modem bank 224 is located separately from CM 218. CDs interfacing to CM 218 through this interface establish an IP connection to CM 218 using the well-known Point-to-Point protocol (PPP), or optionally, any other equivalent link-layer protocol, running over one of several available standard dial-up modem protocols.

In one embodiment, CDs 202, 204, and 206 each provide a data packet connection to CM 218 in accordance with IS-707.5 IP packet data service option. IS-707.5 is a well-known interim standard describing packet data services in a CDMA communication system. Changes to this interface may be made to optimize group communication performance. No changes to the infrastructure side of this interface are desired, except an implicit requirement for RTP/UDP/IP Header Compression in base stations in order to support media broadcasting using RTP (Real Time Protocol). Alternatively, CDs 202, 204, and 206 could support most group communication activities using Quick Net Connect (QNC) and IS-707.4, as described later.

CM 218 communicates with CDs participating in the group communications via transport and group communication application layer protocols. These communications include application signaling (PTT transmission privilege requests, group registration, etc.) as well as the real-time media packet streams distributed by CM 218. All real-time media are distributed via dynamic RTP/UDP/IP interfaces on CM 218 and CDs. If CRTP header compression is unavailable (a well-known header compression technique), real-time media is encapsulated directly within UDP/IP packets, or datagrams. All real-time signaling occurs via dynamic UDP/IP interfaces on CM 218 and the CDs. Other signaling may take place via a predefined data protocol interface, such as TCP/IP, between CM 218 and the CDs using the well-known Session Initiation Protocol (SIP), an application-level call signaling protocol designed to support Internet telephony, for example.

CM 218 provides an external user interface to communicate with external users using the same transport and group communication application layer interfaces used to interact with the CD 208, except that these protocols operate over IP/PPP and a dial-up modem connection.

CM 218 provides an administration interface that may be an application level protocol that provides administrative access of a CM user, group, and administration database and associated parameters using Hyper-Text Markup Language (HTML) semantics. In one embodiment, the interface operates over TCP/IP. A second network interface supporting administrative functions may also exist. This second administrative interface supports the bulk of real-time transfers of administrative information, including membership lists and network status reports, to client administrative applications. SM 228 communicates with CDs using a re-keying protocol operating over TCP/IP.

One embodiment of the system and method for providing group communication services operates over standard air interface IP packet data services, for example, as defined in IS-707, and conventional IP. One traffic channel is allocated per registered CD while a group is active, i.e., media being transmitted between members. Each group is defined and identified by its name, which when combined with the address of a host system, defines a destination address that may be expressed in the form of a SIP URL. As previously mentioned, SIP (Session Initiation Protocol) is a well defined signaling protocol used to control setup and control signaling between CDs and CM 218.

Figure 4:
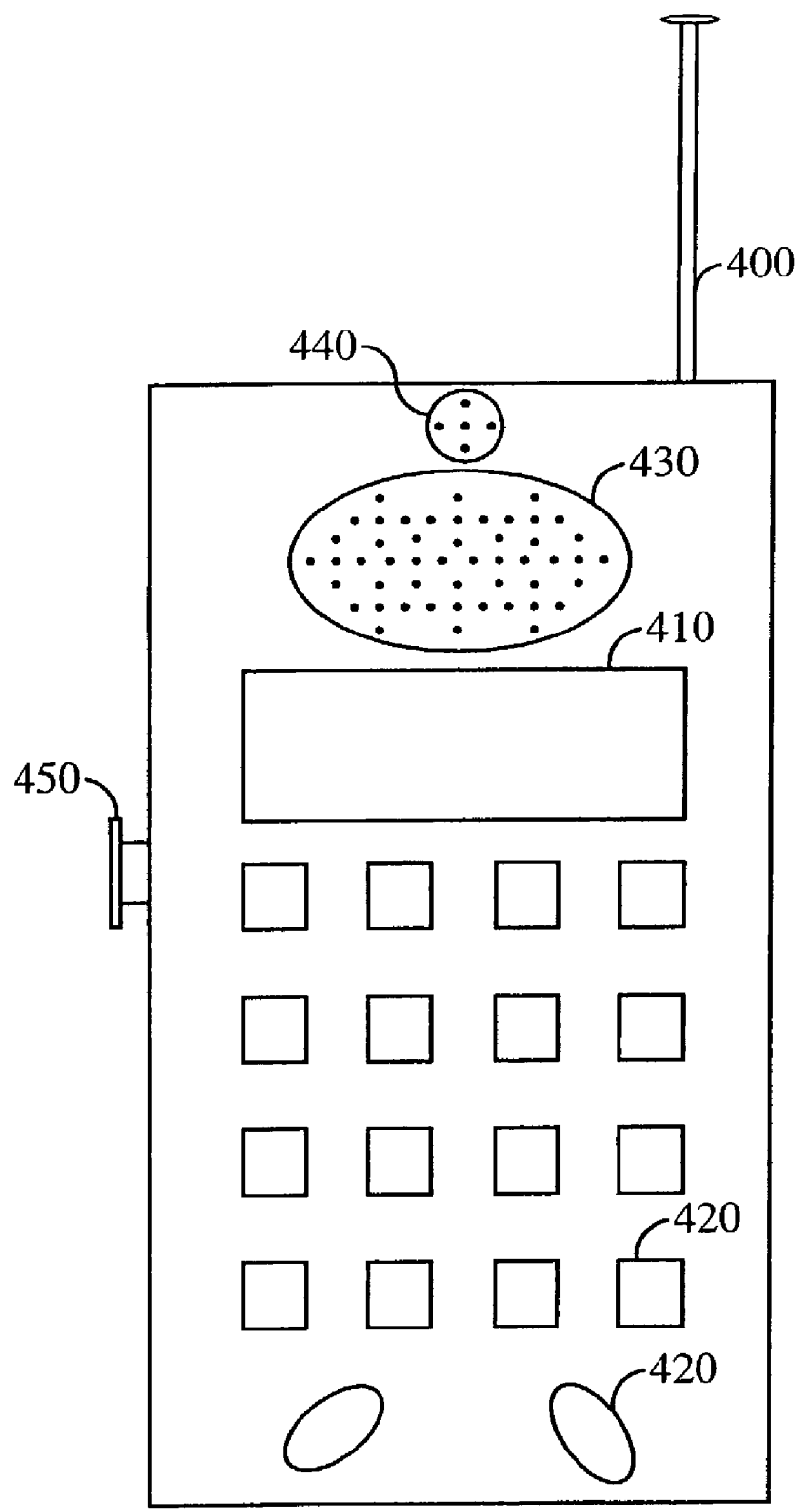
FIG. 4 illustrates a communication device used in the group communication of FIG. 2.

FIG. 4 illustrates CD 202 as used in one embodiment of the system and method for providing group communication services. Further details of CD 202 may be found in copending U.S. patent application Ser. No. 09/518,776, entitled "METHOD AND APPARATUS FOR PARTICIPATING IN A GROUP COMMUNICATION SERVICE IN AN EXISTING COMMUNICATION SYSTEM," filed on Mar. 3, 2000, which is assigned to the same assignee, and is incorporated by reference herein. In this embodiment, CD 202 is a wireless telephone capable of converting media, e.g., video, and/or speech, into data packets suitable for transmission over data network 214, such as the Internet. It should be understood that many of the features incorporated into CD 202, as shown in FIG. 4, may also be implemented in any communication device, and that CD 202 is not intended to be limited to a wireless telephone as shown in FIG. 4. CD 202 typically comprises an antenna 400, a display 410, keys 420, a speaker 430, an earpiece 440, and an optional push-to-talk (PTT) switch 450. Display 410 may be used for displaying video, still image, or text. In an alternative embodiment, CD 202 may use one of the existing keys 420 as a push-to-talk switch when in a push-to-talk mode of communications instead of using a dedicated push-to-talk switch 450.

CD 202 may also be equipped to transmit and receive media by integration with any media-processing device such as a portable or fixed computer system, a position reporting system, a meter reading system, a video camera, or a still camera. CD 202 may interface to such media-generating devices using an interface cable, having one end of the interface cable connected to the media-processing device and the other end connected to a communication port (not shown) on CD 202. Alternatively, the necessary internal components of CD may be integrated into the media-processing device to form a single unit suitable for transmitting and receiving media in an integrated package. In either case, CD 202 can be used to transmit media from the media-generating device to one or more group members, or to one or more non-group members, or a combination of both.

CD 202 is generally capable of communicating using one or more modes of operation or "service options." However, it should be understood that the none of the embodiments of the system and method for providing group communication services rely on a communication device having multiple modes of communication. A first service option is used to place standard audio calls from a CD 202 to base station 216. The voice service mode is used to make typical point-to-point telephone calls using the given technology of the associated communication system. For example, the voice service option for CD 202 refers to point-to-point audio communications using IS-95A, a well-known CDMA telecommunications standard promulgated by the Telecommunications Industry Association. The voice service option for CD 208 refers to a standard point-to-point telephone call using PSTN 222 to connect to another wireless or wireline telephone.

A second service option is defined as a data service option, which further can be divided into at least three types of data services: packet data service, asynchronous data service, and synchronous data service. In a CDMA communication system, an asynchronous data service is described by IS-707.5 while a synchronous data service is described by IS-707.4. The various data service options are alternatively implemented using techniques applicable to various other types of communication systems, such as GSM systems and high data rate packet services as described in IS856.

Either type of data service allows CD 202 to communicate with MSC 220 using data protocols, rather than transmitting information using the traditional voice service mode. As explained previously, MSC 220 contains an IWF which routes data packets between CD 202 and CM 218. CD 202 contains circuitry which accepts information such as audio, video, and data, and converts the information into data packets in accordance with a data network protocol such as the well-known TCP/IP protocol.

When used in the voice service mode, a group member uses keys 420 to enter data into CD 202, the data typically comprising an identification number, such as a telephone number, of a second communication device belonging to a person whom the user wishes to communicate. Keys 420 are also used in conjunction with display 410 to choose various communication options. For example, if a member wishes to enter the packet data service option to join a particular group, keys 420 can be used to select one of several possible groups using a menu of options viewable from display 410. CD 202 maintains a list of groups, which represents the set of known groups in which CD 202 can participate. Alternatively, CD 202 maintains a list of all possible groups, whether CD 202 can participate or not. The list may be updated as necessary during interactions with CM 218. The list maintained by CD 202 is analogous in function to a phone-book feature, which is a list of names and dial-numbers that are typically maintained in a standard wireless telephone. The list of groups may be integrated with the phone-book feature so that the act of selecting a group from the group list instructs CD 202 to attempt to join the selected group.

Groups may be designated as either secure or clear groups. Clear groups are groups which do not employ over-the-air eavesdropping security guarantees, such as encryption, while secure groups have provisions for providing encryption. Secure groups are described later herein.

In order to participate in a specific group, CD 202 initially requests that CM 218 add CD 202 to a list of connected group participants for the desired group. The term "connected" means those users who have registered with CM 218 and are at least receiving communications occurring in a group. Hence, CD 202 will initially know or be able to learn the group-address of any groups in which it wishes to participate. Further, CD 202 will initially know or be able to be configured with the address of a top-level server to which SIP requests may be sent.

In one embodiment, CD 202 is preprogrammed with the address of a known or default top-level SIP server providing a current list of groups in which CD 202 is authorized to participate. Alternatively, CD 202 may be preprogrammed with a group-list, which defines at least one group-address in which CD 202 is a member. CD 202 can later send a request to the top-level SIP server to update its group list. In another alternative embodiment, CD 202 contains no preprogrammed SIP addresses or group list information. In this embodiment, a user is provided with a top-level SIP server and group address to interactively enter this information into CD 202 using keys 420. The user may also enter additional group-addresses to a group list, which has already been programmed with entries. This embodiment is analogous to entering personal names and dial-numbers into a conventional wireless telephone phone book.

In one embodiment, CD 202 is also preprogrammed with the IP network address of a primary Domain Name Service (DNS) server, to which CD 202 can send DNS queries. Typically, the address of a DNS server operated by a CDMA cellular carrier will be preprogrammed. CD 202 may also be preprogrammed with the IP network address of an alternate DNS server.

In order to support authentication, CD 202 may use security measures such as Pretty Good Privacy (PGP). CD 202 is preprogrammed with a unique PGP user-id and secret key, which may use to sign SIP transactions when requested by CM 218. The PGP user-id may also be used as a user address for CD 202 for generic transactions, such as INVITE messages.

Finding and Joining Groups

CD 202 may join or leave groups by using call signaling defined by the Session Initiation Protocol (SIP), for example. Each CD 202 is provisioned with a list of group-addresses, and one or more top-level SIP server addresses. If the group-list is empty, the user may interactively specify the address of an existing group. If no top-level SIP server has been defined, the user may interactively specify the address of a top-level SIP server.

Once a top-level SIP server address is known, CD 202 may request an updated list of groups available to it by placing a call using the SIP "INVITE" command to a pre-defined SIP destination. The top-level SIP server may redirect the request to an internal destination or respond to it directly. The INVITE response to this call includes the current list of groups available to CD 202. CD 202 uses this list to update its internal group-list.

After a group has been selected, CD 202 attempts to join the group via the SIP INVITE method by specifying the group-address as the invitation destination and sending the request to the top-level SIP server. The top-level server attempts to map the group-address to a known destination and, if successful, redirects CD 202 to the corresponding SIP user-agent server destination associated with the group's currently assigned multipoint control unit (MCU), which is a portion of CM 218 responsible for managing group traffic. If no mapping is available, the invitation fails.

Normally, the destination SIP user-agent server confirms that CD 202 is authorized to participate in the selected group and responds to the invitation, embedding a description of the media traffic and signaling parameters to use to participate in the group in the content of its response. CM 218 may also reply with an error if it is unable to confirm CD 202 as a legitimate member of the group or if some other error condition arises, such as a failure that precludes normal group operation. If the invitation is accepted, CD 202 acknowledges the response via the SIP "ACK" command. Note that other transient response codes, which indicate call progress, may also be received by CD 202, while the invitation is being processed.

CD 202 updates its group-list to the set of the groups in which it may participate. The user may command CD 202 to query CM 218, even when no group-address is selected, for the purpose of receiving updates to its group-list. If CD 202 determines that it has been added or removed from a group, it will briefly display an appropriate message to the user (for example: "Added to group WELDERS") and/or possibly prompt for user interaction. If CD 202 determines that is not a member of any group, it will similarly inform the user. CD 202 may automatically incorporate new group addresses into its group-list but may prompt the user before deleting addresses of groups in which it has lost membership from the group-list.

CM 218's SIP user-agent server's response to an INVITE request to join a group includes, as embedded content, the group's media and real-time media signaling destination addresses, as well as other group parameters (such as media payload format descriptors). Once confirmed, CD 202 briefly displays feedback to the user, indicates whether the user has listen-only privileges, and enables group service functions. If CM 218 determines that CD 202 is not a member of the selected group, or an error or other exceptional condition occurs, CM 218 responds with a corresponding error response. When such a registration is rejected, CD 202 briefly displays a corresponding error message and group service functions remain idle.

Group Media Communications

Figure 5:
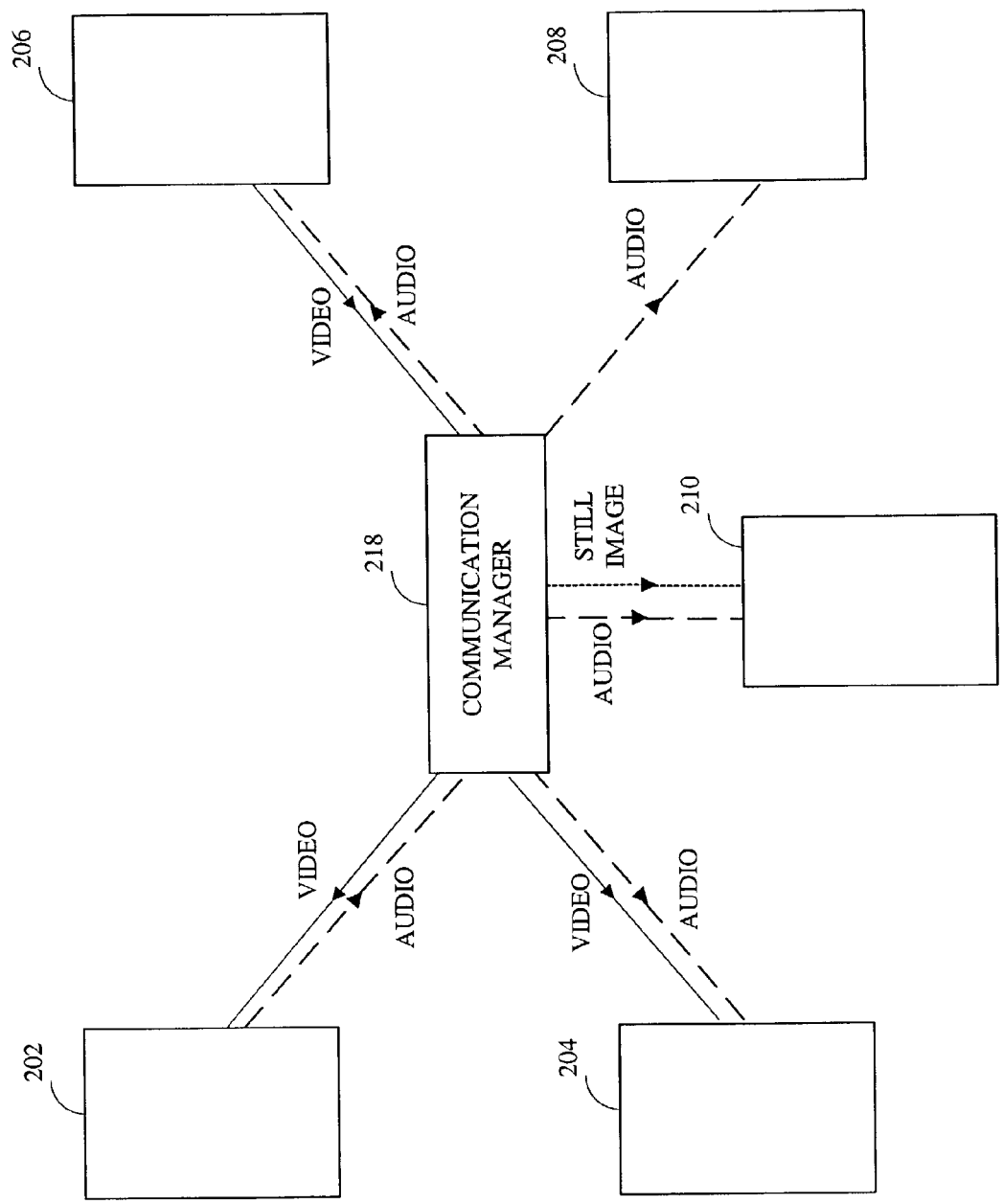
FIG. 5 illustrates a group communication.

FIG. 5 is a diagram illustrating the various modes of media communication, according to one embodiment. Other configurations are, of course, possible. It should be understood that the modes shown in FIG. 5 are applicable to any type of CD.

CD 202, 204, 206, 208, and 210 may be members of a predefined (chat room) or a real-time defined (ad-hoc) group. CD 202, which has the floor for audio communication, transforms the audio signals into packet data and sends them to CM 218, in a half-duplex communication manner over the reverse traffic channel, for example. CM 218 receives the audio information from CD 202, and sends the received audio information to the target CDs, as defined by the established group. For example, CM 218 sends the audio to CDs 204, 206, 208, and 210, in half-duplex communication manner over forward traffic channels.

CD 206, which has video floor for video communication independent from the audio floor, transforms the video signals into packets and sends them to the CM 218, in a half-duplex communication manner over the reverse traffic channel, for example. CM 218 receives the video information from CD 206, and selectively sends the received video information to the target CDs, as defined by the established group, in half-duplex communication manner over forward traffic channels. For example, CM 218 sends the received video to CDs 202 and 204, which have video capability and their respective users have selected receiving video. CM 218 sends no video to CDs 208 and 210, which either have no video capability or their users have selected receiving no video. CM 218 sends one or more still images to CD 210, which may have only a display or otherwise its user has selected receiving still images, rather than full video, to save cost of receiving full video. The still images may be pre-stored images or captured from the real-time video being communicated in the group. Advantageously, the user having the audio floor may interact with the user having the video floor, e.g., giving instructions as to how operate, point, and/or shoot video.

When a user is concurrently receiving video and sending audio through the same CD, each media is transmitted in a half duplex mode, e.g., the CD receives the video on a forward link, but sends audio on the reverse link. However, when a user is concurrently receiving or transmitting both video and audio through the same CD, both video and audio are transmitted in a half duplex mode on the same link, e.g., the CD receives both audio and video on a forward link or the CD transmits both audio and video on a reverse link.

In one embodiment, the same CD has both the audio and video floors. In one embodiment, there are more than audio and/or video floor. For example, there may be multiple videos, covering more than conference halls, and/or multiple audio, covering speech and background music, stereo sound, or surround sounds.

Short Data Burst Call-Signaling Messages

In one embodiment, a significant reduction in PTT latency may be achieved through the use of short data burst (SDB) messages, as provided in "TIA/EIA/IS-2000 Standards for cdma2000 Spread Spectrum Systems," hereinafter referred to as "the cdma2000 standard." In one embodiment, SDB messages may be sent over a dedicated active channel, such as the forward fundamental channel (FCH) or a forward dedicated common control channel (F-DCCH). SDB messages may also be sent over a common active channel, such as the reverse access channel (R-ACH), reverse enhanced access channel (R-EACH), forward common control channel (F-CCCH), or paging channel (PCH). SDB messages may be transported by radio burst protocol (RBP), which maps the messages onto an appropriate and available active layer channel. Because SDB messages may carry arbitrary IP traffic and may be sent over common active channels, SDB messages provide a mechanism to exchange group call signaling when participating CDs have no available dedicated traffic channel.

Interaction with Point-To-Point Services

CD 202 allows the user to originate and receive conventional PSTN point-to-point calls as well as participate in group communications. CD 202 supports at least a group communication application and one or more point-to-point applications. Hence, one embodiment of the system and method for providing group communication services allows seamless receipt and placement of point-to-point media communication while group services are enabled and activated.

CD 202 may be used to place a point-to-point media communication services or secure point-to-point media communication at any time, whether group services are active or not, as long as CD 202 is not simultaneously acting in both. If CD 202 has registered as a member of a group, CD 202 may un-register from the group when placing a point-to-point media communication. Once the point-to-point media communication has been completed, CD 202 may transparently re-register as a member of the current selected group.

CD 202 may be used to receive PSTN or secure point-to-point media communication while group-services is enabled, within the limitations imposed by the particular air-interface cellular infrastructure. If CD 202 has joined a group, and the selected group is active, CD 202 appears busy to an incoming PSTN call and the call is given the appropriate busy treatment by the air-interface cellular infrastructure. If the selected group is quiet but the group's hang-time has not expired, the call will also be given the normal busy treatment by the air-interface cellular infrastructure. However, if the selected group's hang-time has expired, and the group has been placed in dormant mode, and CD 202 has released its over-the-air resources, the call may not be given busy treatment by the infrastructure and CD 202 may be paged to initiate receipt of the incoming call. A user may optionally configure CD 202 to disable receipt of incoming point-to-point calls while a group is selected and CD 202 is registered as a member.

Communications Manager

Figure 6:
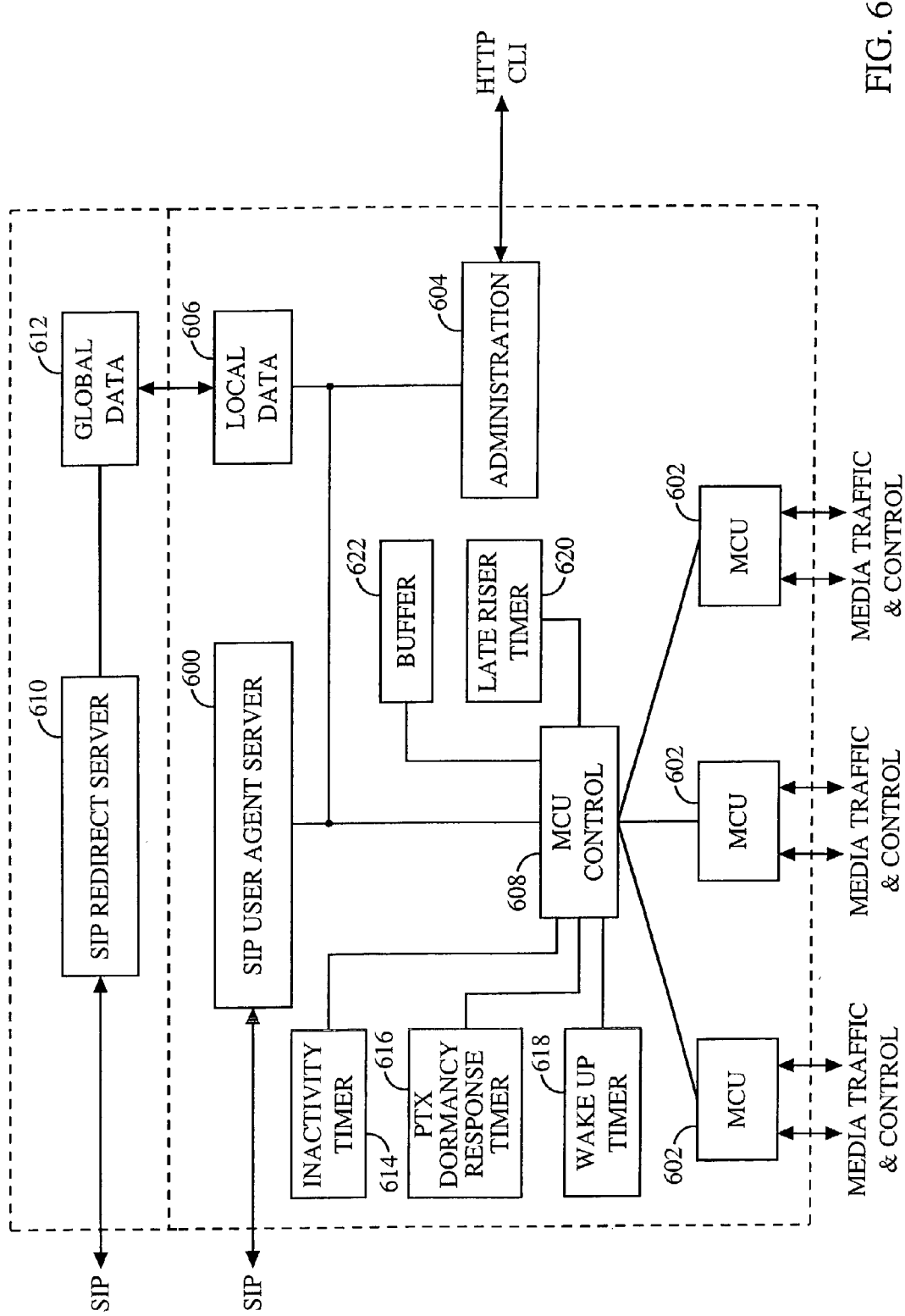
FIG. 6 is a functional block diagram of a communications manager used in the group communication system of FIG. 2.

FIG. 6 illustrates a functional block diagram of CM 218 according to one embodiment. Further details of CM 218 may be found in copending U.S. patent application Ser. No. 09/518,622, entitled "METHOD AND APPARATUS FOR ENABLING GROUP COMMUNICATION SERVICES IN AN EXISTING COMMUNICATION SYSTEM", filed on Mar. 3, 2000, which is assigned to the same assignee, and is incorporated by reference herein. CM 218 supports at least three logical external interfaces, which, in one embodiment, are all IP based, and which may all have multiple instances operating simultaneously. A SIP interface is provided by SIP user agent server 600. Real-time media signaling and control are supported by one or more media control units (MCU) 602. Administration functions are supported by a combination of CLI and HTTP servers, shown in FIG. 6 as administration interface 604.

Internally, MCUs 602 may be managed by a control function, which assigns an MCU 602 to groups and SIP invitations to MCUs. Local memory 606 stores information relating to individual group members (referred to herein as a user database) and information relating to various groups (herein referred to as a group database). External access to local memory 606 is controlled through administrative interface 604.

No assumption is made as to whether CM 218 is implemented as a single physical entity, or several entities connected via a high-speed internal communication path. It may be deemed necessary, for example, to dedicate special-purpose hardware to handle the real-time media switching loads, or use a physically separate database engine to host local memory 606. Likewise, top-level SIP redirect server 610 and global database 612 may be separated from the media or administrative functions and implemented as a separate entity.

Both top-level SIP redirect server 610 and SIP user-agent server 600 associated with the MCUs require access to user and group information defined in the system. Specifically, top-level SIP redirect server 610 may either query global database 612 or be given explicit SIP registrations in order for it to redirect incoming INVITE requests to a corresponding appropriate destination (in most cases, user-agent server 600). Similarly, SIP user-agent server 600 requires access to local memory 606 to authenticate users, confirm users" access to groups, and define groups" session descriptions.

Local memory 606 receives user and group information from global database 612 as an MCU is assigned to a group by redirect server 610. After information has been provided to local memory 606, it can be provided to administrative interface 604, user agent server 600, and/or MCU control 608 on an as-needed basis.

MCU control 608 monitors the operation of individual MCUs, such as controlling startup and/or shutdown, assigning a group to an MCU 602, and sharing of status information between local memory 606 and various CDs and/or administrative interface 604. MCU 602 is typically a digital signal processing device capable of executing a set of program instructions stored in a memory, such as a ROM.

MCU 602 is responsible for receiving incoming data packets from a transmitting CD and for sending duplicate copies of the received data packets to other members of the group to which the transmitting CD belongs. As each data packet is received by MCU 602, it is stored in a memory (not shown). The transmitting CD may be identified by interrogating the data packet. In one embodiment, an IP address representing the transmitting CD is included in each data packet as a way to perform the identification.

After the transmitting CD has been identified, MCU control 608 retrieves a list of group members belonging to the group associated with the particular MCU 602 from local memory 606. (Each MCU is assigned to one group only). A destination address is associated with each active group member, i.e., group members who are presently registered with MCU 602, in local memory 606. In one embodiment, the destination address is an IP address. MCU control 608 then creates a duplicate of the original data packet, except that the destination address identified within the data packet is modified to reflect the destination address of the first group member. Next, MCU control 608 creates a second duplicate data packet, addressed to the second group member. This process continues until the original data packet has been duplicated and selectively sent to the active group members identified in local memory 606.

PSTN User Interface

As stated previously, CD 202 comprises a wireless telephone in one embodiment. However, because many of the embodiments of the system and method for providing group communication services use extensive IP and IP transport protocols, any IP capable platform with connectivity to CM 218 can potentially serve as a CD.

Hence, dial-up users (i.e., a user operating a device that communicates primarily through the PSTN) may connect to CM 218 through existing IP terminal-servers operated by Internet Service Providers (ISP). An IP terminal-server acts as a bridge between the PSTN and a local area network (LAN) supporting IP. It consists of a bank of modems, which provides a connection point for PSTN modems, a server, and one or more network interfaces. The server is capable of hosting multiple independent PPP sessions, one for each connected modem user. The server also acts as a router, routing IP packets between each of the individual PPP interfaces and any active LAN interfaces. In one embodiment, an integrated IP terminal-server is used and in another embodiment, an external IP terminal server is used. Both server types are readily available commercially.

The dial-up terminal server ideally supports the ability to negotiate CRTP Header Compression over a PPP session. Similarly, the PPP stack used by a dial-up client should also include and attempt to use CRTP. However, because of the additional bandwidth available over high-speed modems, the inability for a dial-up based user to negotiate CRTP Header Compression may not necessarily force a group to avoid using RTP based payload specifications.

If the terminal-server is located on a cellular service provider's internal LAN, and hence near, in a network topology sense, to the service provider's CM 218, dial-up users may avoid quality-of-service issues that can contribute to high end-to-end latency if the path between the ISP's terminal-server and CM 218 traverse a portion of the Internet.

PSTN-based group participants follow similar SIP registration procedures as outlined for wireless users, join groups in a similar manner, adhere to a similar media signaling protocol, and encapsulate packets within RTP or UDP based on the group's session description and according to the payload specifications described previously.

Since PSTN based modems generally do not support a dormancy concept similar to that described above, dial-up based group participants generally ignore any sleep messages received from CM 218.

Group Administration—CM Administration Interface

In one embodiment of the system and method for providing group communication services, CM 218 includes a separate administration interface 604 through which CM 218 may be administrated and real-time status reports regarding CM operation obtained. Other variations are possible. The administration interface 604 consists of two network ports, a TCP/IP based Hyper Text Transfer Protocol (HTTP) interface supporting administrative access through a web browser, and a TCP/IP based group communication specific Command Line Interface (CLI).

Administrative functions are supported through a TCP/IP based CLI. Prior to being granted access to the CLI, a potential administrator connecting to CM 218's CLI interface will be authenticated, using well-known techniques.

The CLI is able to be contacted on a well-known, fixed, TCP port address and able to simultaneously manage multiple CLI sessions.

The CLI is capable of supporting several administrative functions, such as creating a new user record in a user database, deleting an existing user record, and modifying an existing user record. Other functionality may include the ability to create new groups in the user database, deleting existing groups, and modifying existing groups. Still other functions may include the ability for an administrator to list all users by user name, dial number, user identifier, as well as other criteria, the ability to list all groups, by group-address and group identifier, in a group database, the ability for an administrator to show all fields for a specific user record, and the ability for the administrator to show all fields for a specific group identified by the group's group identifier or group address. The CLI may further include the ability for an administrator to query for a static status report for a specific group, or individual group member. This function may also allow the administrator to query for real-time (updated) reports, and, in particular, allow the administrator to identify the current list of group participants, the current talker, the presence or absence of media traffic, and identify any media signaling messages sent or received by CM 218.

In one embodiment, CM 218 makes administrative functions available to a generic web browser via a HTTP web server interface with one or more pages formatted using Hyper Text Markup Language (HTML) syntax. At least one of the administrative pages may include a reference to an embedded Java applet.

CM 218 manages and is the focus for all administrative functions pertaining to group administration, including the creation and deletion of groups; defining new and deleting existing users; adding and removing users as group members; and adjusting various operating parameters at a user, group, or CM-wide basis.

Upon delivery to a cellular, or other, service provider, CM 218 uses basic administrative configuration before it can be used to support group communication activities. Required initial configuration involves basic system configuration: assigning passwords to operating system level accounts for root-level system administration and configuring CM 218 network interfaces for proper operation on a local wireless infrastructure network.

Once CM 218 is configured, general group administration can take place. In one embodiment, group administration functions take place through a HTML or other network interface built over TCP/IP. Administrators interact with CM 218 using a conventional World Wide Web (WWW) browser. Administration can take place locally or remotely (anywhere on the Internet, or via dial-up). In one embodiment, however, the underlying transport path for administrative access is TCP/IP. Multiple (two or more) simultaneous administration connections are allowed.

Upon connecting to CM 218 for the purpose of group administration, the administrator will generally authenticate itself to ensure that only authorized administrative actions are accepted. Different levels of access are allowed; for example, authorized group members may connect directly to CM 218's administrative interface to modify specific group membership lists, but more generic administrative privileges are reserved for specific administrative accounts. For clarity, administrative actions are separated into those that deal specifically with user definitions and those that define groups. A user definition may include a username, unique CD cellular system identifier, CD phone number, and user e-mail address. CM 218 will also internally define a unique user identifier, which may be passed to CD 202 and used to uniquely identify the user in signaling messages. A group definition may include a group-address, group hang-time, private dispatch timeout, and member list. A group's member list consists of a list of member records, which individually contain a user identifier and priority level. A member with the minimal level of priority generally has listen-only privileges.

CM administrators can monitor the current status of groups for which they have administrative privileges. In particular, administrators can determine the current list of group participants as well as monitor the group's state (active, inactive, dormant, in wake-up, etc.). Whenever the group is active, the administrator can also monitor the identity of the current talker. Additional statistics and status, such as the length of current session, total talk time of an individual user or a group, the last time that a particular group member held the transmission privilege, mean number of registrants, etc., may also be available to administrators through the administrative interface 604.

CD 202 may also support the concept of a "private call"—a half-duplex point-to-point call instigated by the caller pressing the push-to-talk button, which is accepted without ringing the target CDs, as occurs in a traditional full-duplex point-to-point call.

Network Protocols

The operation of one embodiment of the system and method for providing group communication services can be described and defined at two levels, which generally operate independently of each other. The lower level, which comprises a physical, link, network, and transport layer, is described here. The upper level, which comprises group communication and related application level protocols, is described later herein.

One embodiment of the system and method for providing group communication services operates over standard Internet and related protocol stacks, such as that provided by the IS-707.5 Packet Data Service Option in a CDMA communication system. Of course, other embodiments could alternatively use a data service applicable to the particular type of communication system being used, such as a GSM communication system. Various embodiments of the system and method for providing group communication services may also operate over V.32bis, V.90, or similar PSTN modem standards, or be used entirely within the public Internet, independently of any IS-707.5 segments.

Most group communication network traffic can be described as either signaling or media traffic. Signaling traffic can be further differentiated into two distinct categories: call setup and control signaling, which consists primarily of SIP invitation requests and acknowledgements, and media signaling, which comprises primarily real-time floor control requests and related asynchronous messages. Media traffic comprises real-time point-to-multipoint voice or data broadcasts.

Signaling Protocols

Group communication call setup and call control signaling may be performed in accordance with the well-known Session Initiation Protocol (SIP), although any signaling protocol may be used in the alternative. Although SIP may be transported using either the User Datagram Protocol (UDP) or Transmission Control Protocol (TCP), CD 202 performs all SIP based signaling functions using UDP in one embodiment and CM 218 expects to receive all SIP signaling requests via UDP.

In one embodiment, CM 218 implements both a SIP user-agent server and a SIP redirect server. To support group communications, CD 202 implements a SIP user-agent client. CM 218 operates by listening for incoming SIP connections on an advertised port, in one embodiment, UDP port 5060. When a connection occurs, the SIP server receives and processes requests according to SIP call-signaling conventions. The server is capable of processing multiple call-signaling connections in parallel.

To conserve network resources, CD 202 may release its UDP connection with the SIP server after it has successfully (or unsuccessfully) joined a group. The UDP connection can be reinstated later to send additional SIP call-signaling requests (for example, to leave a group or switch to another group).

Because UDP provides unreliable, connectionless transport, application level reliability guarantees are necessary to ensure robust communication. These guarantees are implemented by SIP-compliant endpoints, i.e., the CDs in communication system 200. SIP call-signaling UDP streams are encapsulated within a data network protocol, such as IP. No special formatting is required. SIP call-signaling IP packets exchanged between a wireless-based CD or a dial-up PSTN-based CD 208 are encapsulated within PPP. Again, no special formatting is required.

In one embodiment, SIP call-signaling PPP frames exchanged between a cellular-based CD 202 and a base station 216 are encapsulated within the Radio Link Protocol (RLP), a well known wireless protocol for transmitting data over-the-air. For dial-up PSTN-based CDs, an appropriate modem standard, such as V.32bis or V.90, replaces RLP. In either case, no special treatment is required and an error-free physical link is not required.

In one embodiment, group communication media signaling, as well as voice and data traffic, are transported using UDP/IP datagrams. When CRTP header compression is available, media traffic may be further encapsulated using RTP at the application layer and header compression techniques are applied as appropriate to UDP/IP incoming and outgoing UDP/IP traffic.

Media signaling requests and responses are encapsulated within UDP datagrams. When available, CRTP header compression may be applied to reduce the impact of sending uncompressed UDP/IP headers.

Each CD dynamically selects a UDP port on which it intends to listen for group communication media signaling requests and communicates the port number to CM 218 as part of the SIP invitation it delivers when attempting to join a group.

A group's CM media signaling destination address (including the UDP port number) is described in the group's session description delivered as part of a successful SIP INVITE request's response. Unlike SIP signaling addresses, media signaling destination addresses are group specific and may change between instances of CD 202 joining a group.

In one embodiment, multiple groups hosted by the same CM operate independently and do not share media signaling or media traffic ports.

Media Traffic

Media traffic from CD 202 is encapsulated by grouping one or more data frames representing media information within an RTP/UDP or UDP payload. In one embodiment, the data frames comprise frames generated by a vocoder inside CD 202. The use of RTP with CRTP enabled is recommended to minimize end-to-end media latency and provide interoperability with future IP telephony applications and services. In either case, CD 202 dynamically selects the UDP port on which it expects to receive media traffic and communicates the port number to CM 218 as part of the SIP invitation it delivers when attempting to join a group.

CM 218 describes the group's vocoder and transport encapsulation protocol, as well as its media traffic destination address (including the UDP port number), in the session description response to a successful SIP invitation request. Like a group's media signaling addresses, the media traffic destination addresses are groupspecific and may change between instances of CD 202 joining a group.

Media traffic is encapsulated at CD 202 using RTP, which segments each UDP datagram into a RTP header and payload. Media traffic may optionally be encapsulated purely using UDP, with no RTP encapsulation, typically when CRTP header compression is unavailable or unsupported by a group member. The structure of the UDP payload follows the definition given for a corresponding RTP payload, without the RTP header fields.

The decision to encapsulate media directly into UDP is generally configured by the group's administrator and advertised by the group's session announcement.

In addition to video and/or audio, groups may also support arbitrary data broadcasts, such as secure group rekey, email, data files, etc. If a group supports a data broadcast channel, CM 218 will advertise the media type in the group's SIP session description when CD 202 formally joins the group. Like traditional media broadcasts, generic data broadcasts operate over RLP in one embodiment (or a corresponding physical layer).

In one embodiment, CD 202 includes the capability to resolve Internet domain names into Internet addresses using the Domain Name Service (DNS) protocol, as defined in RFC 1034. Alternatively, CD 202 operates only as a DNS client or resolver, as described in RFC 1035.

In order for CD 202 to resolve DNS hostnames, CD 202 is preprogrammed with the IP network address of a DNS server. The DNS address should also be configurable by CD 202 service provider and, optionally, by the user.

CM 218 may optionally be configured to act as a DNS server, as described in RFC 1035. Although it may respond to DNS requests from foreign entities using TCP as the transport protocol, CM 218 also encapsulates DNS messages using UDP.

Extension to Cellular Multicast Channel

The various embodiments of the system and method for providing group communication services has been designed to take advantage of the development of a cellular multicast channel, if available. Such a channel generically allows one transmitting station to address multiple listening stations, or CDs, directly, without the need for multiple separate rebroadcasts of the transmitted data.

To take advantage of the efficiencies provided by a cellular multicast channel, a group's media signaling and traffic destination addresses would become conventional IP multicast channels, and all CM originated media signaling and traffic broadcasts could become multicast broadcasts. CD originated media signaling, traffic broadcasts, and SIP signaling would likely remain as point-to-point communications.

Infrastructure Support

When operating over cellular CDMA infrastructure, one embodiment of the system and method for providing group communication services requires the existence of data services, such as the Packet Data Service Option outlined in IS-707.5 for the transport of signaling and media traffic. In addition, one embodiment of the system and method for providing group communication services makes use of a dormant mode to allow point-to-point voice services calls to be received during extended periods of group broadcast inactivity. If the IS-707.5 Packet Data Service Option is not available, another embodiment allows implementation using a service known as Quick Net Connect (QNC) and IS-707.4.

QNC provides a protocol stack identical to that provided by IS-707.5. CD 202 can be configured to negotiate a packet connection using QNC rather than IS-707.5, and, if the QNC service is available, treat the connection as a Packet Data Service Option connection.

Dynamic IP (Registration)

In one embodiment, CD 202 is able to detect the fact that its IP network address has or is about to be changed. If CD 202 is participating in a group when the address change occurs, CD 202 again joins the group by invoking the SIP INVITE command, as described below.

The IP network address of CD 202 may change for at least two reasons. A roaming CD may switch cellular systems or cellular networks, and be required to negotiate a new IP network address. Or, CD 202 may experience a service disruption or drop the Data Service Option call for any reason and upon re-establishing service, be assigned a new IP network address. If CD 202 is participating in a group during an address change and does not re-join the selected group in a timely fashion, CM 218 will eventually expire its membership and remove CD 202 from the list for the selected group. CD 202 is removed from the list of active group participants if it does not eventually respond to a series of media signaling request messages.

IP Mobility Support

RFC 2002 describes an IETF standards track protocol, commonly known as Mobile IP, that allows for the transparent routing of IP datagrams to mobile Internet nodes. One embodiment of the system and method for providing group communication services allows transparent operation over Mobile IP, with little or no modifications to the application or its associated protocol stacks. Like SIP, Mobile IP includes a registration mechanism to locate mobile hosts within the network at large. Unlike SIP, the Mobile IP registration mechanism operates at the network layer and is necessarily tied directly to IP level addressing schemes. SIP registration occurs at the application layer and is defined independently of network level addressing details.

Under Mobile IP, a mobile host (i.e.,CD 202) connects to the network via a foreign agent, which assigns CD 202 a "care-of" address. The care-of address is a temporary but legal address to which IP datagrams can be addressed from anywhere on the Internet. CD 202 uses the care-of address to contact its home agent and inform it of CD 202's current care-of address. After confirming the identify of CD 202, the home agent then tunnels packets addressed to CD 202's permanent home address (which normal Internet routing mechanisms will deliver to the home agent directly or to the home agent's network) to CD 202 using the CD 202's care-of address.

Although, in one embodiment, the system and method for providing group communication services can operate over Mobile IP, Mobile IP may adversely impact the end-to-end latency and perceived voice quality of media traffic and signaling if CD 202 joins a group using its permanent address and the home agent is located far, in a network topology sense, from CM 218 and CD 202. In such a case, media traffic may need to be routed over the public Internet or other variable quality service networks, which may not have been required if Mobile IP was not used. To avoid this, in most cases, it is preferable for CD 202 to access group-broadcast services using its care-of address and re-join groups when its care-of address changes.

Multiple Group Communication Systems

The above description assumes that in at least one embodiment, the system and method for providing group communication services is deployed as an isolated service, with one CM 218 operating completely independently within a specific geographic region or area of service. However, it should be understood that the at least one embodiment of the system and method for providing group communication services is also capable of extending group communication services beyond that of the local geographical area. This is accomplished by deploying CMs in multiple communication networks, including GSM, TDMA, and CDMA cellular networks, in satellite communication systems, such as Globalstar™ and Iridium™, and corporate intragroups using local area networks or wide area networks.

Communication between CMs of different systems takes place using SIP server redirects, the exchange of user database and group database records, and additional messages between CMs to facilitate an integrated NBS service.

In an integrated group communication service, it may be preferable to allow any CM to assume ownership of a group, and hence, not tightly bind the operation of a group to a specific CM 218 or MCU 602. The choice of CM might instead be determined dynamically, based on proximity to the majority of group participants (determined using available position location techniques), available quality of service on a service provider's inter-system network, and other factors. Similarly, any CM's SIP redirect server should be capable of redirecting any CD to the appropriate MCU's SIP user-agent server, and/or, if necessary, forwarding CDs to another SIP redirect server.

In an integrated system, a group's group-address has meaning throughout the group communication system. As a result, one or more top-level SIP servers are responsible for redirecting INVITE requests and distributing group participants to MCUs. These top-level SIP servers should share a common user and group database, providing identical functionality and redirection decisions at different network rendezvous points. As a result, the redirection of CD originated invitations provides an important and critical layer of abstraction that allows multiple CM installations to be integrated into a single homogeneous group communication service.

Figure 7:
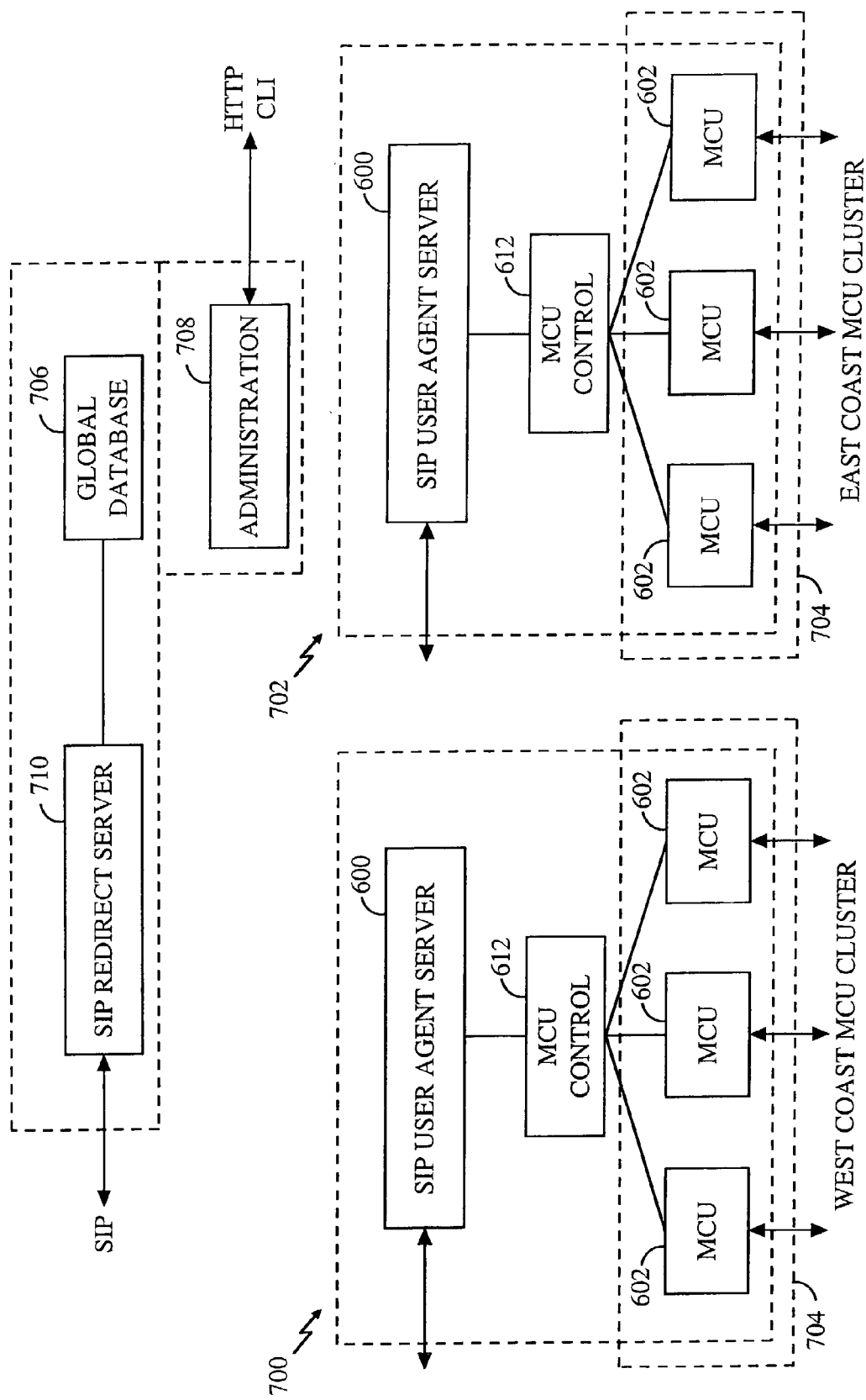
FIG. 7 is a functional block diagram of an integration of a first communications manager and a second communications manager.

An integrated group communication system is shown in FIG. 7. In this example, CM 700 supports a terrestrial cellular communication network and CM 702 supports a satellite communication network. In an integrated group communication service, the system scales by duplicating the functionality provided by MCU Controller 612, its associated set of MCUs 602, known as an MCU cluster 704, and associated SIP User-Agent Server 600. A single database 706 and administration interface 708 is shared by the multiple CMs in the system. Communication between functional entities is not shown.

The process by which a CD joins a group in such an integrated system is similar to that used in a system comprising a single CM installation. CD 202 initially sends SIP requests to the top-level (now global) SIP redirect server 710. SIP redirect server 710 redirects, via signaling mechanisms such as SIP, the requesting CD to the appropriate destination. In the case of an INVITE request to join a group, the destination is the SIP user-agent server 600 associated with the MCU with current responsibility for the group in question. In the case of an INVITE requesting a current list of groups available to CD 202, the destination may generally be any user-agent server capable of responding to the request.

Separately, the redirect server 710 may exchange additional messages with MCU Cluster 704 via inter-application messaging using known implementation-specific protocols and/or messaging conventions.

As in the non-integrated case, special startup action is necessary to ensure that redirect server 710 can determine a destination for the INVITE requests it receives. One possible implementation would require SIP registrations to exist at redirect server 710. It is also possible to require that redirect server 710 query global database 706 and attempt to map each invitation request to a group definition contained therein.

The previous description of the various embodiments is provided to enable any person skilled in the art to make or use the system and method for providing group communication services. The various modifications to these embodiments will be readily apparent to those skilled in the art, and the generic principles defined herein may be applied to other embodiments without the use of the inventive faculty. Thus, the system and method for providing group communication services is not intended to be limited to the embodiments shown herein but is to be accorded the widest scope consistent with the principles and novel features disclosed herein.

Those of skill in the art would understand that information and signals may be represented using any of a variety of different technologies and protocols. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. An exemplary storage medium is coupled to the processor, such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The description of the disclosed embodiments is provided to enable any person skilled in the art to make or use the present invention. Various modifications to these embodiments may be readily apparent to those skilled in the art, and the generic principles defined herein may be applied to other embodiments, e.g., in an instant messaging service or any general wireless data communication applications, without departing from the spirit or scope of the invention. Thus, the present invention is not intended to be limited to the embodiments shown herein but is to be accorded the widest scope consistent with the principles and novel features disclosed herein. The word "exemplary" is used exclusively herein to mean "serving as an example, instance, or illustration."

I claim:

1. A method in a communication device (CD) for communicating multimedia with a communication manager (CM) operating in a group communication network, the method comprising:
   providing a type of the CD to the CM, the type indicating the media that the CD is capable of communicating;
   selectively communicating the media based on the type of the CD; and
   media traffic from the CD is encapsulated by grouping one or more data frames representing media information, including media payload format descriptors, within a payload and upon confirmation that the CD is authorized to participate in a selected group and in response to an invite request to participate in the selected group, a description of media traffic and signaling parameters is embedded and provided to group participant.

2. The method of claim 1, wherein said type indicates a video camera and said media includes video.

3. The method of claim 1, wherein said type indicates a still camera and said media includes still image.

4. A method in a communication device (CD) for receiving multimedia from a communication manager (CM) operating in a group communication network, the method comprising:
   providing a request to the CM, the request indicating the media that the CD is capable of receiving;
   selectively receiving the media based on the request; and
   media traffic from the CD is encapsulated by grouping one or more data frames representing media information, including media payload format descriptors, within a payload and upon confirmation that the CD is authorized to participate in a selected group and in response to an invite request to participate in the selected group, a description of media traffic and signaling parameters is embedded and provided to group participant.

5. The method of claim 4, wherein said request includes a request for receiving video.

6. The method of claim 4, wherein said request includes a request for receiving a still image.

7. A computer readable medium containing computer executable instructions for communicating multimedia between a communication device (CD) and a communication manager (CM) operating in a group communication network, the instructions when executed perform a method comprising:
   providing a type of the CD to the CM, the type indicating the media that the CD is capable of communicating;
   selectively communicating the media based on the type of the CD; and
   media traffic from the CD is encapsulated when grouping one or more data frames representing media information, including media payload format descriptors, within a payload and upon confirmation that the CD is authorized to participate in a selected group and in response to an invite request to participate in the selected group, a description of media traffic and signaling parameters is embedded and provided to group participant.

8. The computer-readable medium of claim 7, wherein said type indicates a video camera and said media includes video.

9. The computer-readable medium of claim 7, wherein said type indicates a still camera and said media includes still image.

10. A computer readable medium containing computer executable instructions for communicating multimedia between a communication device (CD) and a communication manager (CM) operating in a group communication network, the instructions when executed perform a method comprising:
    providing a request to the CM, the request indicating the media that the CD is capable of receiving;
    selectively receiving the media based on the request; and
    media traffic from the CD is encapsulated when grouping one or more data frames representing media information, including media payload format descriptors, within a payload and upon confirmation that the CD is authorized to participate in a selected group and in response to an invite request to participate in the selected group, a description of media traffic and signaling parameters is embedded and provided to group participant.

11. The computer-readable medium of claim 10, wherein said request includes a request for receiving video.

12. The computer-readable medium of claim 10, wherein said request includes a request for receiving an image.

13. An apparatus for communicating multimedia with a communication manager (CM) operating in a group communication network, comprising:
    means for providing a type of a communication device (CD) to the CM, the type indicating the media that the CD is capable of communicating;
    means for selectively communicating the media based on the type of the CD; and
    media traffic from the CD is encapsulated by grouping one or more data frames representing media information, including media payload format descriptors, within a payload and upon confirmation that the CD is authorized to participate in a selected group and in response to an invite request to participate in the selected group, a description of media traffic and signaling parameters is embedded and provided to group participant.

14. The apparatus of claim 13, wherein said type indicates a video camera and said media includes video.

15. The apparatus of claim 13, wherein said type indicates a still camera and said media includes still image.

16. An apparatus for receiving multimedia from a communication manager (CM) operating in a group communication network, comprising:
- means for providing a request to the CM, the request indicating the media that the CD is capable of receiving;
- means for selectively receiving the media based on the request; and
- media traffic from the CD is encapsulated by grouping one or more data frames representing media information, including media payload format descriptors, within a payload and upon confirmation that the CD is authorized to participate in a selected group and in response to an invite request to participate in the selected group, a description of media traffic and signaling parameters is embedded and provided to group participant.

17. The apparatus of claim 16, wherein said request includes a request for receiving video.

18. The apparatus of claim 16, wherein said request includes a request for receiving an image.

19. A communication device (CD), comprising:
- a receiver;
- a transmitter;
- a processor programmed to implement a method for communicating multimedia with a communication manager (CM) operating in a group communication network, the method comprising:
- providing a type of the CD to the CM, the type indicating the media that the CD is capable of communicating; and
- selectively communicating the media based on the type of the CD; and
- media traffic from the CD is encapsulated by grouping one or more data frames representing media information, including media payload format descriptors, within a payload and upon confirmation that the CD is authorized to participate in a selected group and in response to an invite request to participate in the selected group, a description of media traffic and signaling parameters is embedded and provided to group participant.

20. The CD of claim 19, wherein said type indicates a video camera and said media includes video.

21. The CD of claim 19, wherein said type indicates a still camera and said media includes still image.

22. A communication device (CD), comprising:
- a receiver;
- a transmitter;
- a processor programmed to implement a method for receiving multimedia from a communication manager (CM) operating in a group communication network, the method comprising:
- providing a request to the CM, the request indicating the media that the CD is capable of receiving; and
- selectively receiving the media based on the request; and
- media traffic from the CD is encapsulated by grouping one or more data frames representing media information, including media payload format descriptors, within a payload and upon confirmation that the CD is authorized to participate in a selected group and in response to an invite request to participate in the selected group, a description of media traffic and signaling parameters is embedded and provided to group participant.

23. The CD of claim 22, wherein said request includes a request for receiving video.

24. The CD of claim 22, wherein said request includes a request for receiving still image.

* * * * *